EFFECTS OF CURING TIME ON THE MOISTURE EXPANSION OF BUILDING MATERIALS MADE OF SAND-CLAY BLENDS CONTAINING VARIOUS TYPES AND AMOUNTS OF CLAYS

*LEGEND*
- ● 0% CLAY
- □ 2.5% CLAY
- ◇ 5% CLAY
- △ 10% CLAY
- ○ 15% CLAY
- ◁ 20% CLAY
- ▲ 10% CLAY ARMEEN TREATED

KAMIL SOR
JOHN C. MUNDAY        INVENTORS

BY W. O. J. Heilman

PATENT ATTORNEY

EFFECTS OF CURING TIME ON THE WET FLEXURAL STRENGTHS OF BUILDING MATERIALS MADE OF SAND-CLAY BLENDS CONTAINING VARIOUS TYPES AND AMOUNTS OF CLAYS

EFFECTS OF CURING TIME ON THE WET COMPRESSIVE STRENGTHS OF BUILDING MATERIALS MADE OF SAND-CLAY BLENDS CONTAINING VARIOUS TYPES AND AMOUNTS OF CLAYS

THE RATIO OF WET FLEXURAL STRENGTH TO MOISTURE EXPANSION VS. CURING TIME FOR CHEMICAL TREATED AND UNTREATED BUILDING MATERIALS

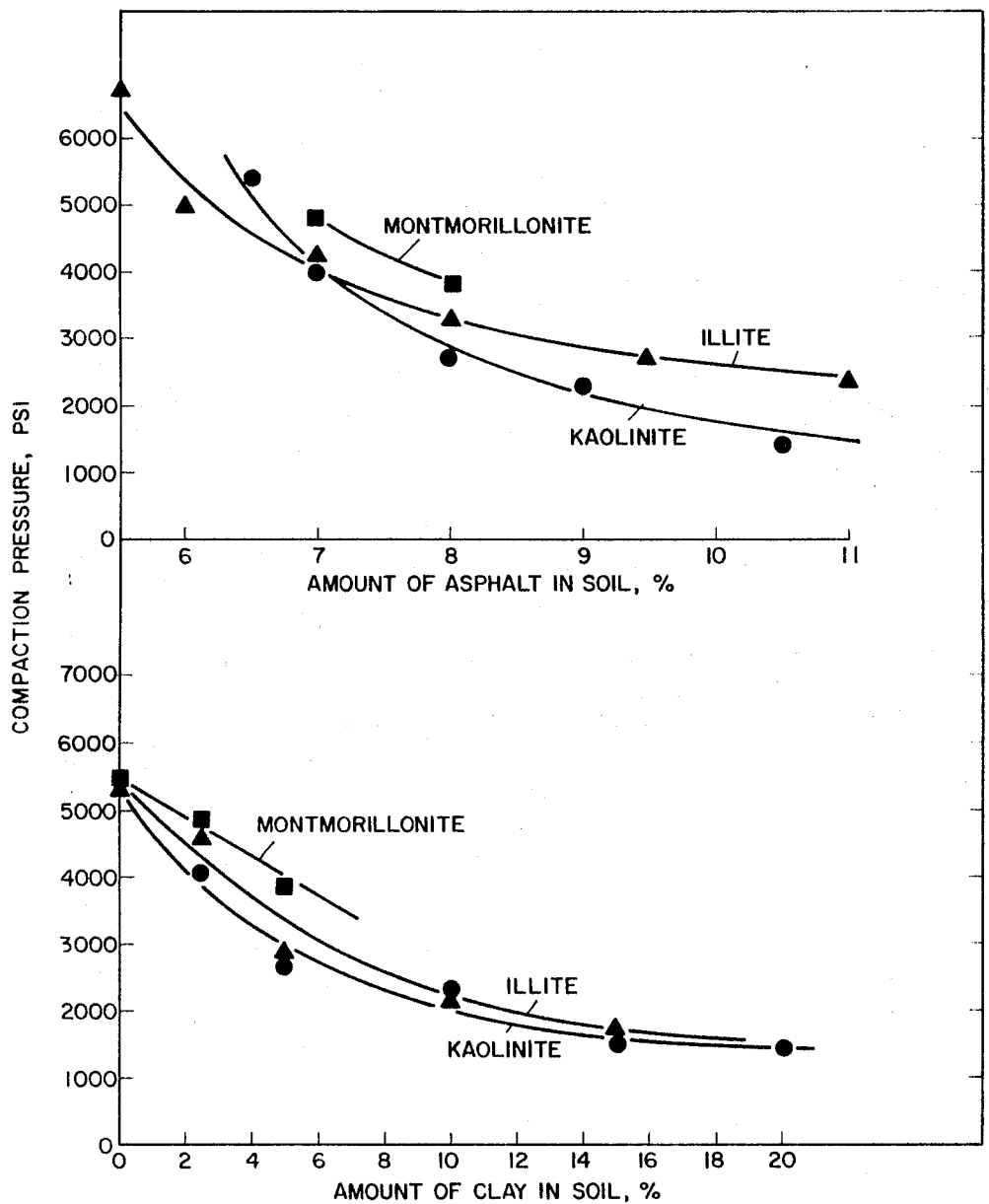

3,457,090
Patented July 22, 1969

3,457,090
AMINE TREATMENT—BUILDING MATERIALS
Kamil Sor, Linden, and John C. Munday, Cranford, N.J., assignors to Esso Research and Engineering Company, a corporation of Delaware
Filed June 16, 1966, Ser. No. 557,994
Int. Cl. C08h *13/00, 17/06*
U.S. Cl. 106—281    7 Claims

ABSTRACT OF THE DISCLOSURE

An improved process of preparing structural elements containing a bituminous binder and aggregate, wherein the improvement comprises heating the aggregate with from about 0.1 to 2% by weight of a hydrophobic amine having from about 8 to 24 carbon atoms in the molecule to secure a structural element having high compressive and tensile strength and a low moisture response factor.

---

Figure 1:
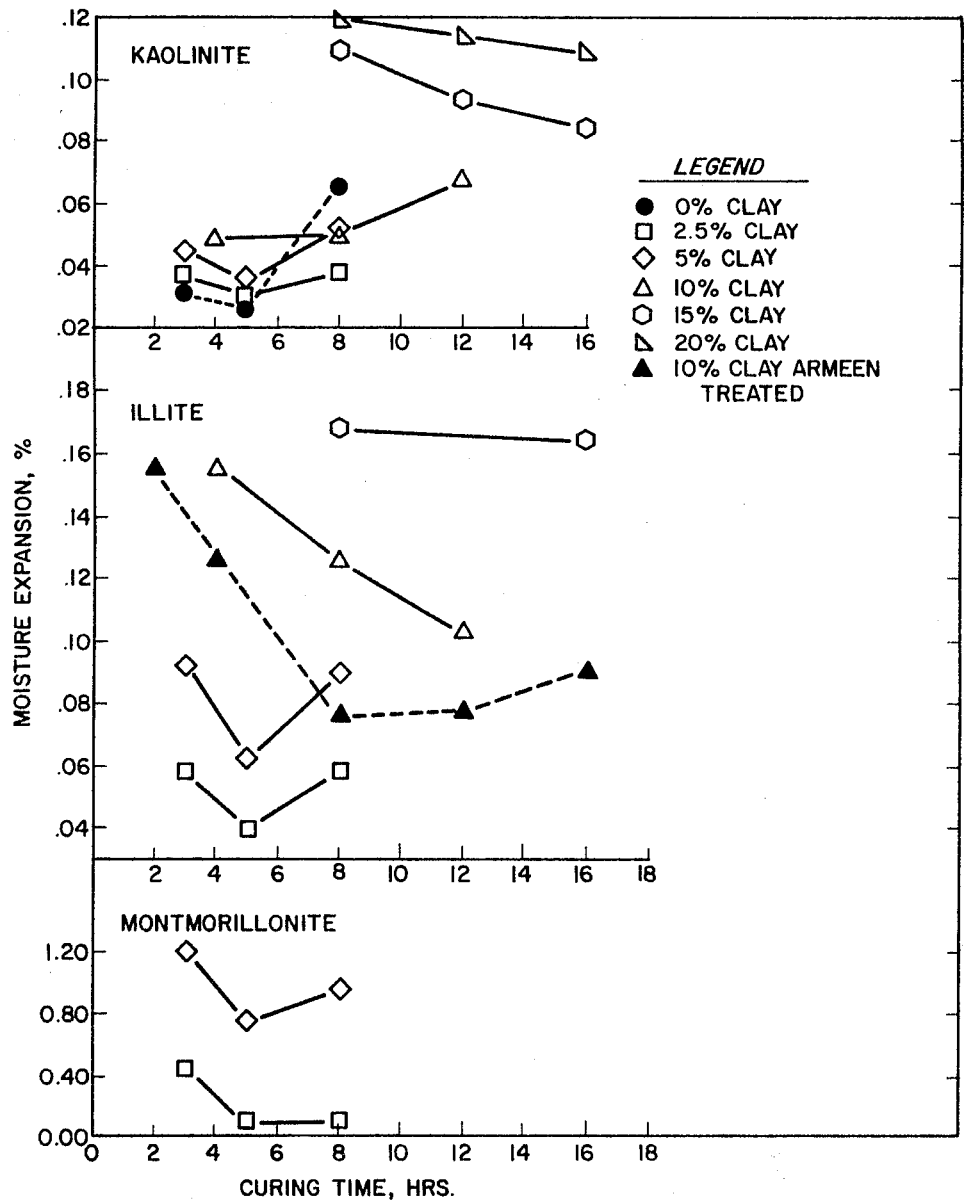

The present invention is concerned with solid compositions produced from finely divided aggregate and a binder such as petroleum residue; and with a process of manufacture of these compositions and with shaped articles of manufacture comprising these compositions. The invention is particularly concerned with improved asphalt-stabilized compositions of soil or finely divided aggregate so converted as to have enhanced dry and wet compressive strengths, superior tensile and flexural strength and low water absorption properties. In the process of the present invention, the binder, which is initially a fluid, semifluid, or plastic, oil-soluble material, is converted into an oil-insoluble, infusible, carbonaceous bond. The solid compositions of the present invention are dense, rock-like compositions characterized by having superior creep-resistant properties, freeze/thaw-resistant properties, fire-resistant properties, solvent-resistant properties and properties of impenetrability by water. The solid compositions of the present invention are also characterized by having uniform precision of dimensions and by being substantially nonporous and very smooth. These characteristics enhance their value as materials of construction. The present invention is particularly concerned with building materials having an excellent moisture response factor which is secured by the utilization of hydrophobic amines.

The stabilization of soil and other particulate solids by petroleum binders, particularly for use in construction, has not hitherto enjoyed commercial success. A very limited number of houses, in which sandy clay-type soils in conjunction with asphalt have been used to form adobe building blocks, has been built in the United States. In making these blocks, asphalt was applied to the soil as a water emulsion of an asphalt cutback solution in a naphtha. The mixture was then hand tamped generally in wooden molds, and the blocks sun cured for several weeks. The asphalt functioned mainly as a waterproofing agent rather than as a binder, since the asphalt increased the wet strength of the soil but did not appreciably increase dry strength. In this process it was considered essential to wet the soil with water before mixing it with the asphalt cutback or the asphalt emulsion. The water deflocculated the clay aggregate and served as a compaction lubricant.

It was found that building blocks produced by this prior art method and the composition thereof gave maximum unconfined wet compressive strengths at about 3 to 8 wt. percent asphalt, depending upon the type of soil used, but failed to approach the compressive and tensile strength of commercially available concrete blocks and bricks. Despite their low unit strength, these materials were of some limited use in arid or semiarid regions in the form of thick, solid blocks where economic factors favored their use in certain types of construction. These blocks were wholly unsuitable in other geographical regions where there was a significant variation in humidity or where these building materials would contact moisture. Thus, beside very low compressive and tensive strength necessitating the use of thick solid blocks for adequate strength, the prior art asphalt-stabilized soil compositions could not be used in home construction, even in solid block form, where there was water contact or a variation in the humidity of the air, without a subsequent exterior coating. Thus, these prior art materials could not be employed, for example, below grade or at footing levels. A further disadvantage of these prior art materials is the poor adhesion characteristics of exterior finishes such as paint, mortar, stucco, and the like, to the exterior surface of the blocks. The blocks apparently expand and contract in response to small changes in the humidity of the air, resulting in extensive cracking and peeling of exterior coatings.

There have now been discovered a stabilized composition, composed of critical quantities of subdivided solids and bitumen residua, and a process for stabilizing solids which composition and process avoid many of the disadvantages of the prior art and provide, for example, asphalt-stabilized aggregate and soil compositions of enhanced dry and wet compressive strengths. The materials of the present invention have an excellent moisture response factor, secured by the use of a hydrophobic amine.

It has been found that if the soil to be stabilized is uniformly and thinly coated with an asphalt, maximum wet and dry compressive strengths are generally obtained at more than about 3 wt. percent asphalt on a sandy clay soil. It has further been discovered, contrary to the prior art, that the presence of water as a compaction lubricant not only is not essential, but is actually detrimental to compressive strength. The employment of certain amounts in the range of 3 to 30 wt. percent of an asphalt with soils containing no moisture or only small amounts of moisture, allows solids to be compacted to high densities with both wet and dry compressive strengths exceeding the strength of commercially available nonmetallic building materials while also allowing a wider range of soil types to be used. Additionally, these soils or other compacted finely divided solids or aggregates are substantially waterproof and do not significantly absorb water or tend to expand in the presence of moisture. Further, the stabilized soil compositions of the invention can be used in any climate or geographical area either above or below grade level and require only decorative finish. Ordinary house paints and other exterior coatings adhere well to the exterior surface and there is little or no tendency for the binder to bleed into the paint or exterior coating.

In accordance with another specific adaptation of the present invention, a critical quantity of asphalt is used in conjunction with soil of certain particle-size distribution and is shaped and compressed within a critical range of its theoretical 100% density. The compressed solid is then heat treated under specific conditions to produce a high quality product suitable as a building material such as blocks, bricks, tile, board, pipe, and the like.

Thus, in accordance with the present invention, 3 to 30 wt. percent, preferably 5½ to 12 wt. percent of a bituminous binder, such as asphalt, is mixed with a subdivided solid or finely divided aggregate plus a small but critical quantity of a hydrophobic amine. The mixture is then compressed to a density of about 70 to 98%, preferably to a density of about 80 to 98%, and more preferably 80 to 95%, based upon the theoretical density. The compressed product is heat cured in an oxidizing atmosphere at a temperature in the range from about 250° to 550° F., preferably from about 360° F. to 500° F., for a period of time from about 1 hour to 10 days, preferably from about 4 hours to 80 hours and, most preferably, from 8 hours to 24 hours. For example, very high quality products are secured when treating at a temperature in the range from about 375° F. to 400° F. for a period of in from about 4 to 16 hours, such as about 10 hours.

The amines are water-insoluble hydrophobic amines of a large organic molecule such as those containing from about 8 carbon atoms to 24 carbon atoms in the molecule. The amines should contain at least one $NH_2$ group but may be a di or triamine. Desirable amines are, for example, octadecylamine, Duomeen-T and a residue of Armeen S. Properties of these amines are listed in the following Table 1.

about 1.07 at 77° F. Other properties of such residual oils, normally termed asphalt bases or asphalt fluxes, may vary to a considerable extent depending upon the particular crude oil from which they are derived.

Asphalts prepared from residual oils such as those set forth above may be classified as either straight reduced asphalts or as oxidized asphalts. Straight reduced asphalts are produced by the steam distillation, vacuum distillation, blending or solvent deasphalting of residual oils. These operations remove a significant quantity of the lower boiling, more volatile material present in the residual oils and result in a product having a softening point between about 100° and about 170° F., although higher softening points can be obtained by more extensive treatment.

Oxidized asphalts are produced by contacting a resid-

TABLE 1.—Properties of Octadecylamine and Duomeen-T and Armeen Residue [1]

|  | (2) | (3) | $RNH_2$ |
|---|---|---|---|
| Chemical formula |  |  |  |
| Nature |  |  | Fatty amine. |
| Molecular weight | 269.5 | 320.0 | 521.7. |
| Melting point, °F | 122 | 95–108 | 27° C. |
| Boiling point, °F | 662 |  |  |
| Flash point, °F | 335 | 290 | 315 |
| Fire point, °F | 380 | 425 | 354. |
| Toxicity | None | None | None. |
| Solubility in water | Insoluble | Insoluble | Insoluble. |
| Solubility in hexane, benzene, toluene | Soluble | Soluble | Soluble. |
| Appearance | Solid | Heavy liquid | Paste. |
| Thermal stability at 400° F | Stable | Stable | Stable. |
| Vapor pressure (mm. Hg): |  |  |  |
| at 270° F | 1 |  |  |
| at 367° F | 10 |  |  |
| at 440° F | 40 |  |  |
| at 494° F | 100 |  |  |
| at 595° F | 400 |  |  |

[1] A residue of Armeen-S, which is made up of amine bottoms from cocoa, soya and tallow primary amine, secured by distillations (Armour product). It contains 26.6% primary amines and 41.5% secondary amines.
[2] $CH_3(CH_2)_{17}H_2$.
[3] $NH_2(CH_2)_3NH-R$ where R=$C_{18}$ fatty acid.

Among other desirable amines are the following: octylamine, nonylamine, decylamine, dodecylamine, di and triphenylamine, methyl and ethyldiphenylamine, tetradecylamine, hexadecylamine, diethyl hexadecylamine, and octadecadienylamine.

The preferred binder employed in the present invention comprises those materials commonly referred to as asphalts, such as natural or petroleum residua of thermoplastic solid or semisolid consistency at ambient temperatures, normally of brown to black cementitious materials in which the predominating constituents are bitumens. The bituminous material to be used may be selected from a wide variety of natural and industrial products. For instance, various natural asphalts may be used such as natural Trinidad, gilsonite, Grahamite and Cuban asphalts. Petroleum asphalts suitable for the purposes of this invention include those asphalts obtained from California crude, from tar sands, Venezuelan or Mexican petroleum asphalt, or Middle East or a Mid-Continent airblown oil and the like, or combinations thereof. Petroleum asphalts also include those asphalts derived from hydrocarbon feed stocks such as bitumen, asphaltic residua obtained in a petroleum refining process such as those obtained by the vacuum distillation of petroleum hydrocarbon crude oils, the solvent deasphalting of crude residuum fractions, tarry products from the chemical refining such as oxidation of high molecular weight hydrocarbons, those asphalts obtained from hydrogenated coal products, the asphaltic material obtained in the thermal or catalytic cracking of petroleum to obtain gasoline or other light fractions or any combination of these materials.

Petroleum asphalts are generally prepared from petroleum residual oils obtained by the distillation of an asphaltic or semiasphaltic crude oil or thermal tar or by the fluxing of harder residual asphalts with heavy petroleum distillates. Such residual oils are high boiling liquids or semisolids which may have softening points from about 32° F. to about 120° F. and are generally characterized by specific gravities ranging from about 0.85 to ual oil with air or a similar oxidizing agent, alone or in the presence of an oxidizing catalyst such as ferric chloride, phosphorus pentoxide or the like. The oxidation process serves to dehydrogenate certain constituents of the asphalt, leading to the evolution of water and some carbon dioxide. Oily constituents are thus converted into resins and resins are converted into asphaltenes. Very little oil is removed during the oxidation operation. The penetration and ductility properties of oxidized asphalts are generally somewhat higher for a given softening point than are those of the straight reduced products. Both straight reduced asphalts and oxidized asphalts are useful in the invention.

Although the petroleum asphalts are preferred, other suitable bituminous material would include coal tar, wood tar, and pitches from various industrial processes. The invention can also be successfully practiced with chemically modified asphalts such as halogenated, e.g. chlorinated or sulfurized or phosphosulfurized asphalts, as well as asphalts treated with epoxides or haloepoxides like ethylene oxide and epichlorohydrin, or with silane halides, nitrobenzene, chlorinated aliphatics such as carbon tetrachloride and halohydrocarbons such as methylene chloride and the like. Additionally, the asphalts can be mixed with minor amounts, e.g., 1 to 10 wt. percent, of other natural and synthetic thermoplastics and thermosetting materials like rubbers, resins, polymers and elastomers, of an oily, resinous or rubbery nature. Non-limiting examples of suitable materials include polyolefins, polypropylene, polyethylene, polyisobutylene, polymers from steam cracked naphthas, and the like; natural or synthetic rubberlike butyl rubber, halogenated butyl rubber, polydienes like polybutadiene, elastomeric copolymers of styrene and butadiene, copolymers of ethylene and propylene and the like; epoxy resins; polyalkylene oxides; natural and synthetic waxes; polyvinyl acetates; phenol aldehyde condensation products; and the like; and combinations thereof.

Furthermore, in a modification wherein the asphalt is chemically modified by reaction with liquid reagents, for example, CCl4, the reagent liquid can often be used as the asphalt solvent, whereupon the desired reaction occurs before, during, or after the compaction of the soil-asphalt cutback mixture, or during, or after the curing step, or the reaction may occur continuously during both finishing process steps.

Satisfactory asphalts, for example, are those designated in the trade as fluxes, binders, and various oxidized asphalts. Data on some typical suitable asphalts are shown below:

| Asphalt | Softening point, °F. | Penetration at 77° F. |
| --- | --- | --- |
| Flux A | <75 | >300 |
| Binder C | 113 | 85–100 |
| Oxidized Asphalt 1 | 180–200 | 24 |
| Oxidized Asphalt 2 | 200–235 | 18 |

Also, bitumen subjected to any of the commonly used petroleum or refining and treating processes such as distillation, steam reduction, solvent separation or blending, and the like can be employed. The invention is of particular value with oxidized asphalts, for example, those asphalts prepared by airblowing or chemically oxidizing asphaltic residua at elevated temperatures (400 to 500° F.) with or without the presence of catalytic agents, such as compounds of phosphorus (like phosphorous pentoxide) or of the transition metals (like ferric chloride). These oxidized asphalts commonly have ASTM softening points of at least 100° F., e.g. 100 to 300° F., or higher. These asphalts and specially those oxidized asphalts and straight reduced asphalts having an ASTM softening point of 200° F. and above and an ASTM D–5 penetration at 77° F. of 100 or below, which excludes fluxes, are some of the preferred asphalts of the invention.

In one aspect of the present invention, the foregoing bituminous materials are employed in a volatile organic cutback solvent such as a petroleum naphtha or other solvent boiling within the range of about 175° F. to 600° F., e.g. 200° F. to 400° F. The cutback solvent should preferably be one that is sufficiently volatile to be substantially volatilized during the selected curing step, i.e. a solvent having a boiling point of less than 600° F. or advantageously less than 400° F. Suitable asphalt concentrations in the cutback solution are from 30 to 90 wt. percent asphalt, for example, 50 to 75 wt. percent. Preferably, the Furol viscosity at the temperature at which the cutback is applied should be 100 or less, e.g. 20 to 100 Furol. Suitable cutback solvents would thus include, but are not limited to, hydrocarbons such as toluene, benzene, xylene, mineral spirits, varnish makers' and painters' naphtha, Stoddard solvent, kerosene, halohydrocarbons such as carbon tetrachloride and methylene dichloride, or any combinations thereof.

The cutback asphalt compositions may contain other additive agents such as wetting and emulsifying agents and antistripping agents. The asphalt cutback should be used in an amount sufficient to provide at least 5, preferably 8 to about 30 wt. percent asphalt, or higher, based on the soil or finely divided aggregate. Maximum compressive strengths are usually attained with cutback asphalt at 10 to 20, e.g. 12 to 16 wt. percent, asphalt. The amount and character of the cutback solvent should be such that the cutback composition will have the proper coating viscosity.

The stabilized solid compositions of this invention, prior to molding, comprise a dry subdivided solid material or finely divided aggregate of a particular size distribution and a bituminous binder, for example a high softening point asphalt binder. Thus, one process of the present invention of forming solid structures of high compressive strength comprises thoroughly mixing the dry subdivided solid material with an asphalt binder cutback composition to provide a relatively thin uniform coating of the binder composition on the solid particles; evaporating the solvent from the solid binder composition to obtain a substantially dry pulverulent solid mixture containing from about 3 to 30 wt. percent, preferably from about 5½ to 12 wt. percent, asphalt and small amounts of solvent so that the penetration values (ASTM-D–5, 100 g., 5 secs.) of the asphalt-solvent mixture lie in the range of from 20 to +335 mm./10; compacting the dry solid mixture to the desired density or shape; and curing the compacted mass.

Thus, the solid material of the stabilized compositions is any dry inorganic or organic comminuted solid material, with earth and soil the preferred solid materials for the production of hard dense structures useful in building construction. The solid aggregate material may comprise combinations of materials of natural or synthetic origin with or without the presence of clay-type soils, (these minerals having a particle diameter less than 5 microns). For example, suitable combinations include 0.1 to 30% clay with iron ore fines or other material ranging from 1 to 70%, e.g., 5 to 25%, of the clay material combination. Suitable nonlimiting examples of other aggregate materials include finely subdivided cinder, expanded slag or clay, rock wool, steel wool, abrasives, cellulose fibers, sawdust, cane fibers, bagasse, hemp, jute, coke, iron ore, diatomaceous earths, clays, soil, silt, coal, asbestos, glass fibers, wood chips, quartz, carbonate rocks, volcanic ash, bamboo, and the like, and any combination thereof. The cellulosic and fibrous materials are suitable for use in combination with mineral materials.

Although the presence of clay under certain conditions is essential for high strength asphalt soil structures, non-soil solids do not require the presence of clay. With non-soil structures, the largest particles to be employed should normally not exceed one-third of the smallest dimension of the object to be formed. With small nonsoil objects, a particle size distribution similar to that of soil is preferred.

Thus, a wide variety of solids can be used in conjunction with the asphalt binder to form high strength structures. In general, minerals are the preferred solids especially those which have well-defined crystal shapes and, in particular, those crystals which are readily compacted to low voids content structures. For example, kaolinite, chlorite, talc, mica, illite which crystallizes as plates or discs, are readily compacted with asphalt to produce high strength structures. Asbestos, which has a fibrous structure, and attapulgite, which crystallizes as needles, are less readily compacted.

As is well known, finely divided solids (particles with <2 mm. dia.) are more readily compacted to give nonporous structures than coarse materials. Clay, silt, and sandy soils are examples of finely divided solids occurring in nature. By the process of the invention they can be used to prepare high strength structures. All types of clay soils can be used, ranging from practically 100% clay content to those with low clay content, if the structure will not be exposed to water or humid conditions. If the structure is to be exposed to water or humid conditions, it is essential that the amount of the clays be kept at low levels and generally below 5%, preferably below 2% by weight. These clays swell in the presence of water or humid conditions and other small polar molecules and include the montmorillonites (bentonite), Vermiculite, and degraded illite. Although these clays with asphalt have dry strength, they expand and may disintegrate in the presence of water or humid conditions. For use in the presence of water the soil also should not contain appreciable amounts of organic matter or water-soluble salts.

Particular techniques of processing and manufacturing as well as details with respect to aggregate and the like is described in Serial No. 324,075 filed November 15, 1963, entitled "Finely Divided Aggregate-Binder Structural Members," inventors Dilworth T. Rogers and John C. Munday, now U.S. Patent No. 3,287,146 issued November 22, 1966. Serial No. 324,075 is incorporated by reference into the present application.

Thus, the present invention comprises a marked improvement in the technique described in the application to produce a higher quality product in that its moisture response factor is improved. Moisture response factor is that factor which measures the sensitivity of the product to the presence of moisture. It is well known in the art that any substantial expansion of the product will produce stresses in the product causing cracking and crumbling. If a structure has been erected utilizing the product, expansion of the individual blocks will cause misalignment of the walls, distortion of the building and other structural damages. The moisture response factor should be below 0.1% and preferably not exceed about 0.06%. If the moisture response of the manufactured article does not exceed 0.06%, a high quality product will be secured which can be used in structures which will last permanently. In essence, the moisture response factor defines the percentage that a given length or width will expand when subjected to certain moisture conditions.

The moisture expansion factor is determined using a fixed period, such as a 7-day period, where the specimen is submerged in water. A gauge length of 7¾" under no load may be utilized. Moisture expansion is calculated by the formula:

$$\text{Percent Expansion} = \frac{H_{wet} - H_{dry}}{H_{dry}} \times 100$$

where H is the height of the panel at the given condition. Water temperature in all cases is maintained at 70∓1° F. The moisture expansion of the product under no load is measured using a mechanical comparator gauge equipped with a dial indicator, (0.0001" sensitivity). The sample size is 3¾" x 1" x 7¾" long. Changes in length of the sample are measured to the nearest 0.0001". All measurements have been found repeatable within ±0.00005" which is equivalent to ∓0.00065% of the length of the sample. Thus, for a sample having a moisture response of 0.1%, the maximum measurement error is +0.65% of the moisture response.

The moisture response factor which should preferably not exceed about 0.06% is a function of various conditions and materials such as the particular clay type of the soil used, the product density, the curing temperature and curing time.

As pointed out heretofore, soils used may contain various clay minerals such as are listed in the following Table 2.

TABLE 2.—TYPES AND PROPERTIES OF TYPICAL CLAY MINERALS

| Clay [1] | Cation exchange capacity [1] | Composition |
|---|---|---|
| Kaolinite | 3-15 | $(OH)_8Si_4Al_4O_{10}$ |
| Halloysite [3] | 5-10 | $(OH)_8Si_4Al_4O_{10}$ |
| Montmorillonite [3] | 80-150 | $Si_8Al_4O_{20}(OH)_4nH_2O$; may contain Mg, Fe, Li, Ca, Na. |
| Bentonite [3] | | Rock composed mostly of montmorillonite. |
| Vermiculite | 100-150 | $(OH)_2(Mg,Fe)_3(Si,Al,Fe)_4O_{10}4H_2O$; may vary widely. |
| Illite [3] | 10-40 | $(OH)_4K_2(Al_4Fe_4Mg_{10})Si_{8-y}Al_y)O_{20}$. |
| Chlorite [3] | 10-40 | $Al_2Mg_8Si_3O_{10}(OH)_8$ may contain Fe, Cr, Mn. |
| Attapulgite | 20-30 | $(OH_2)_4(OH)_2Mg_5Si_8O_{20}4H_2O$ Al may replace part of Mg. |

[1] Other clay minerals which may be present in soils, but are noncrystalline such as Hydrous Oxides and Allophanes, may also be used for the manufacture of Esso Building Materials.
[2] CEC (expressed in terms of milliequivalents of cation per 100 g. of soil).
[3] Samples have been obtained from Ward's Natural Science Establishment, Inc. (Reference clay minerals from API Research Project 49.)

However, with respect to the foregoing, the preferred soil is the Kaolinitic-type soil and the Illitic-type soil. If the Kaolinite-type soil is used without amine treatment, the clay content has to be below about 12% to keep the moisture response below about 0.06% and the illite-type soil must have less than 5% clay to have the moisture response not greater than 0.06%. However, if both soils or products made from both soils are treated with 0.4% by weight of Armeen residue, the acceptable clay levels can be increased to 21% and 8% respectively in order to maintain the moisture response below about 0.06%. Thus a feature and novelty of this invention is that when the product also contains trace amounts 0.4% by wt. amine then the tolerable clay levels for these specific soils are increased to 21% and 8% respectively while still maintaining a moisture response factor below 0.06%.

Generally, the amount of amine used in the treatment is in the range from about 0.1% to 1.0% by weight based upon the total mass, preferably in the range from about 0.4% to 0.8%, such as about 0.6% by weight, based upon the total mass. The amine may be added by any suitable means and may be incorporated in the binder before mixing, or added to the soil before mixing, or applied to the finished product at any time but preferably before exposing it to water. It is to be understood that the amine in the final product may be relatively minor as, for example, in the range from about 0.005 to 0.01% by weight.

Methods, among others, that may be used for the addition of amines to the materials are as follows:

(1) *Vapor treatment.*—Cured or uncured materials are placed over the chemical in a closed container which contains about 0.01% amine by weight of the material. The closed container is then placed in an oven for a 2 to 10 hour period, preferably 4 hours, at 400° F., preferably at 350–450° F.

(2) *Soil treatment.*—Amines are mixed with dry soil for several minutes, preferably 10 minutes, before the addition of asphalt.

(3) *Asphalt-soil mix treatment.*—Amines are added to asphalt-soil mix at elevated temperatures, preferably at 300° to 400° F., before pressing.

(4) *Asphalt treatment.*—Amines are dissolved in asphalt binder prior to applying asphalt to soil.

(5) *Emulsion treatment.*—Amines-in-water emulsion are applied on heat cured building materials by a conventional method of application, such as by painting dipping, spraying, etc.

In order to further illustrate the invention, a number of operations were conducted as illustrated by the following examples.

Example I

A number of operations were conducted wherein various amounts of clay were used in the blend and the desired amount of binder determined as well as the time of curing was determined. The results are as follows:

TABLE 3.—AMOUNT OF BINDER AND CURING TIMES USED FOR DIFFERENT CLAY CONTENTS

[Georgia Kaolinite, Fithian Illite, and Wyoming Bentonite-Montmorillonite]

| | Amount of binder (asphalt 85/100 penetration) Optimum | Curing periods, hrs. | | |
|---|---|---|---|---|
| | | Low | Medium | High |
| Percent clay in blend: | | | | |
| 0 | 6.5 | 3 | 5 | 8 |
| 2.5 | 7.0 | 3 | 5 | 8 |
| 5 | 8.0 | 3 | 5 | 8 |
| 10 | 9.0 | 4 | 8 | 12 |
| 15 | 10.5 | 8 | 12 | 16 |
| 20 | 12.0 | 8 | 12 | 16 |

From the above it is apparent that, as the clay content increases from 0 to 20% by weight, the optimum amount of binder required increases from 6.5 to 12% by weight. The hours of curing time required likewise increases from about 3–8 hours to 8–16 hours. Thus, at optimum binder contents and prescribed cure times for the specific type of clay, the wet strength of the material is adequate and the moisture response below 0.06%.

Example II

Three specific clays having the following properties as listed in the following Table 4 were tested as hereinafter described.

TABLE 4.—PROPERTIES OF CLAY MINERALS

| Properties [1] | Type | | |
|---|---|---|---|
| | Kaolinite | Illite | Montmorillonite |
| | Location | | |
| | Macon, Georgia | Fithian, Illinois | Bentonite, Wyoming |
| Purity, percent | 95 | 88 | 90 |
| Nature of impurities | ([2]) | ([3]) | ([4]) |
| C.E.C., meq./100 g | 10 | 25 | 97 |
| Specific surface, m.$^2$/g | 68 | 135 | 800 |
| pH | 6.1 | 6.8 | 8.2 |
| Chemical analysis: | | | |
| $SiO_2$ | 45.20 | 56.91 | 57.49 |
| $Al_2O_3$ | 37.02 | 18.50 | 20.27 |
| $Fe_2O_3$ | 0.27 | 4.99 | 2.92 |
| $FeO$ | 0.06 | 0.26 | 0.19 |
| $MgO$ | 0.47 | 2.07 | 3.18 |
| $CaO$ | 0.52 | 1.59 | 0.23 |
| $Na_2O$ | 0.36 | 0.43 | 1.32 |
| $K_2O$ | 0.49 | 5.10 | 0.28 |
| $H_2O+$ | 13.27 | 5.98 | 6.85 |
| $H_2O-$ [5] | 1.55 | 2.86 | 7.63 |
| $TiO_2$ | 1.26 | 0.81 | 0.12 |

[1] C.E.C.: Cation Exchange Capacity expressed as milliequivalent per 100 grams of clay.
[2] Sericite, Quartz, Illite, Orthoclase mixed layer clays, Titanite.
[3] Sericite, Quartz, Plagioclase, Pyrite, Calcite.
[4] Quartz, Plagioclase, Orthoclase, Calcite.
[5] Adsorbed water.

The clays listed in Table 4 were mixed with Ottawa sand to secure various quantities of clay. The asphalt used was a 85/100 penetration Binder-C and the hydrophobic chemical used was an Armeen residue. The chemical additive was dissolved in the hot asphalt prior to applying the asphalt to the soil. The amount of chemical used was about 0.4% by weight. The results secured with respect to moisture response are illustrated in FIGURE 1. The results indicate that as the curing time is increased, the moisture expansion passes through a minimum. Both the amount and type of clay have a significant effect on the moisture expansion of the building materials.

Example III

Figure 2:
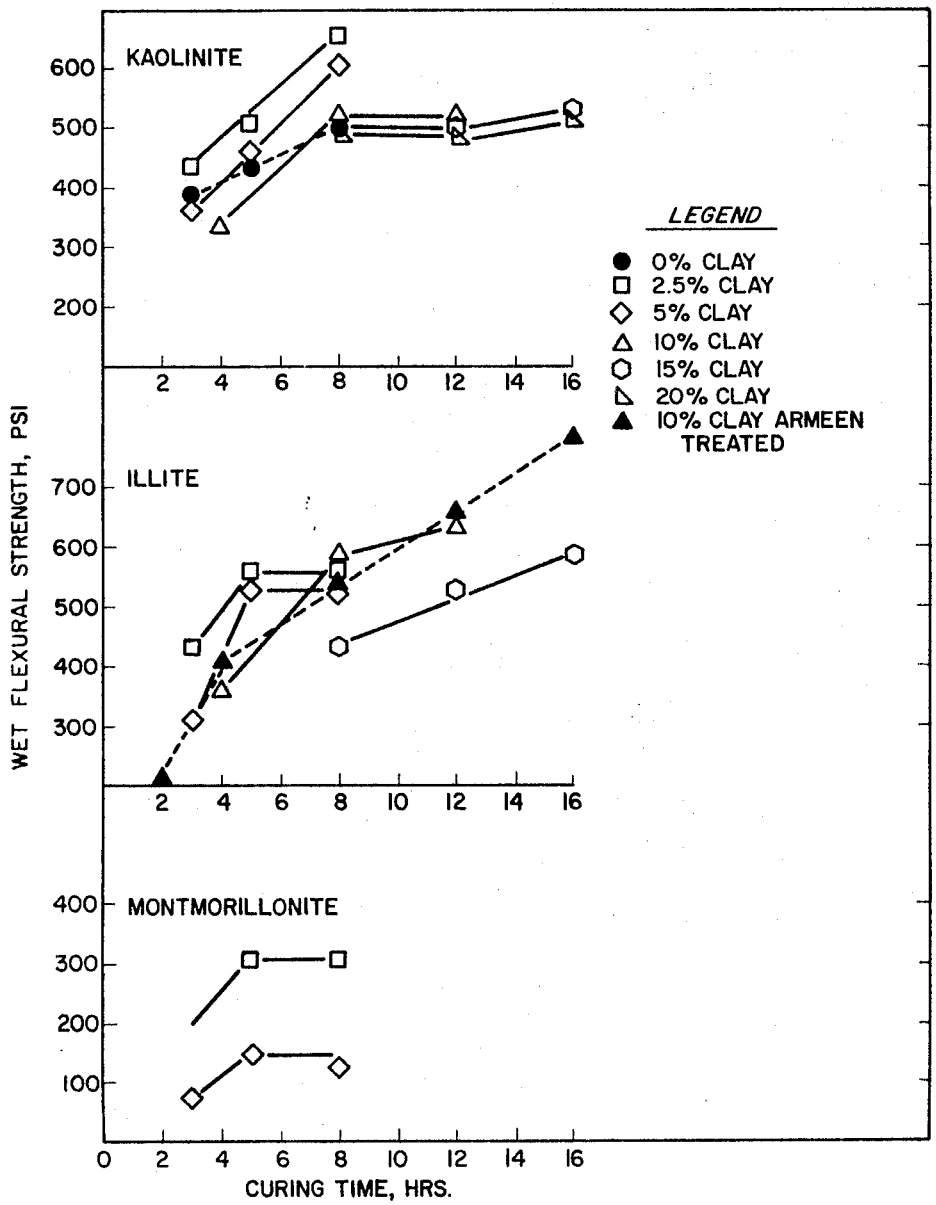

The clays illustrated in Example II were further tested with respect to curing time as compared with wet flexural strength. The results of these tests are illustrated in FIGURE 2. These results indicate that, as the curing time is increased, the wet flexural strengths of the materials tested, pass through a maximum.

At equal clay content, the observed wet strengths for the building materials prepared from soils containing Kaolinite and Illite were about equal. Montmorillonite, however, had lower wet strengths. This is because in the presence of water, montmorillonite clays absorb considerable amounts of water between crystal layers and swell to several times their original size, thus weakening internal cohesive forces. The illitic and kaolinitic type of clays, on the other hand, are nonexpanding and water absorbed cannot enter between crystal layers.

Example IV

Figure 3:
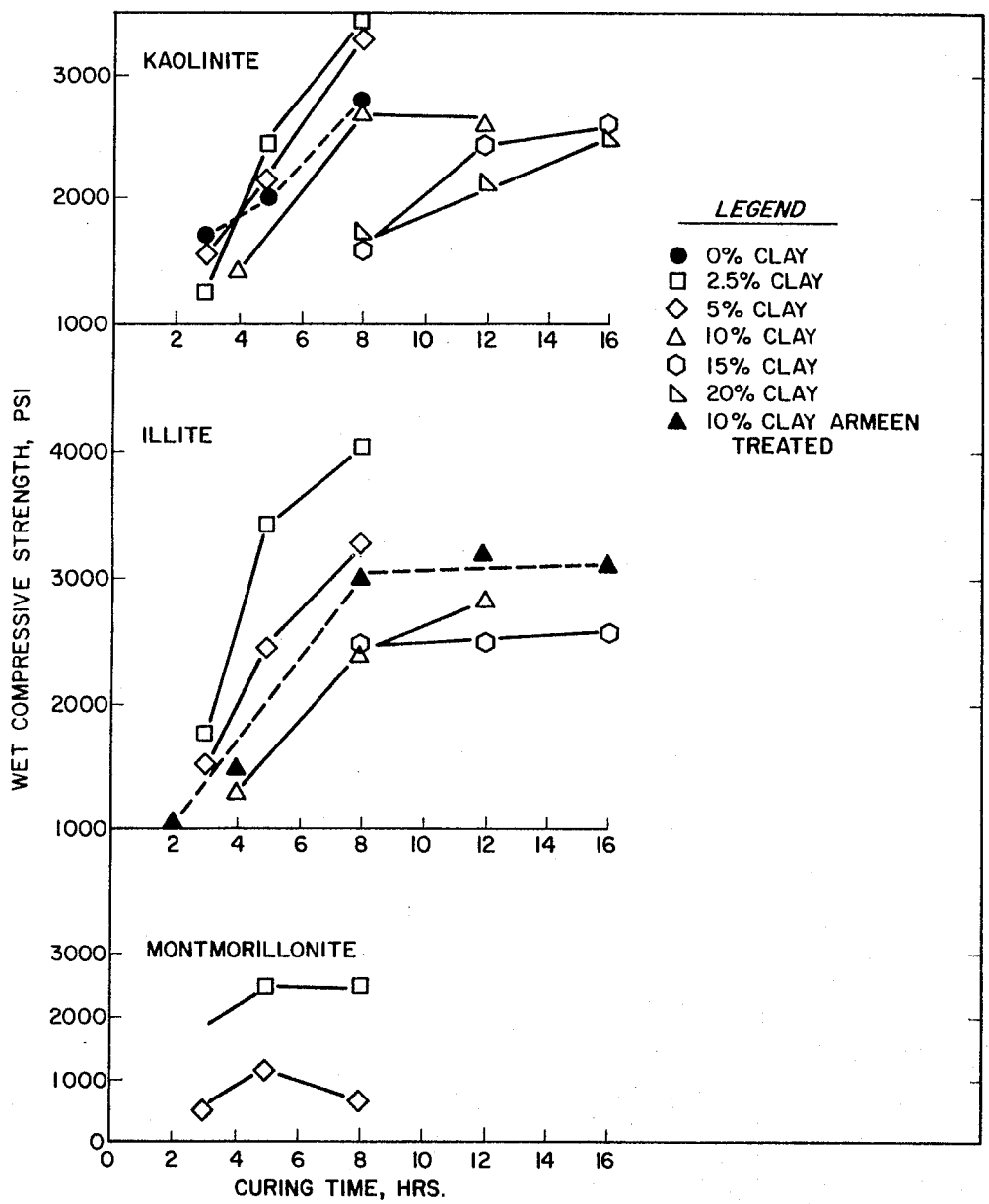

Further tests were conducted with respect to the clays of Example II wherein the wet compressive strength was determined as a function of curing time. The results of these tests are illustrated in FIGURE 3. These results also show that the wet compressive strengths of the building materials used in these studies, increases as the curing time is increased and passes through a maximum. Effects of the amount and type of clay content on the wet compressive strengths of the building materials is similar to the effects mentioned for wet flexural strength (Example III).

Example V

Additional tests were conducted to determine the effect of the amine-treated product whereby the amount of clay could be increased while still maintaining accepted standards with respect to strength and moisture response. The results of these tests are tabulated in the following Table 5.

TABLE 5.—MAXIMUM TOLERABLE CLAY CONTENTS (BY CLAY TYPE) FOR MAKING ACCEPTABLE MOISTURE RESPONSE PRODUCT WITH AND WITHOUT AMINE TREATMENT

| | Maximum amount of clay, percent | |
|---|---|---|
| Clay Type | Untreated | Armeen treated |
| Kaolinite | 12 | 21 |
| Illite | 5 | 8 |
| Montmorillonite | Trace | Trace |

The above shows that the tolerable amounts of clay are increased significantly thus making more of the world's soils usable.

Minimum acceptable strengths are 500 p.s.i. for wet flexural and 2500 p.s.i. for compressive. The 2500 p.s.i. is equivalent to 1000 p.s.i. wet compressive strength on commercial plant product having 60% void space. The 500 p.s.i. wet flexural is a generally reported satisfactory value for concrete block products. The 0.06% moisture expansion value was chosen as the satisfactory level because the latest test structures built with the present materials with an average expansion of 0.06% are performing excellently.

Figure 4:
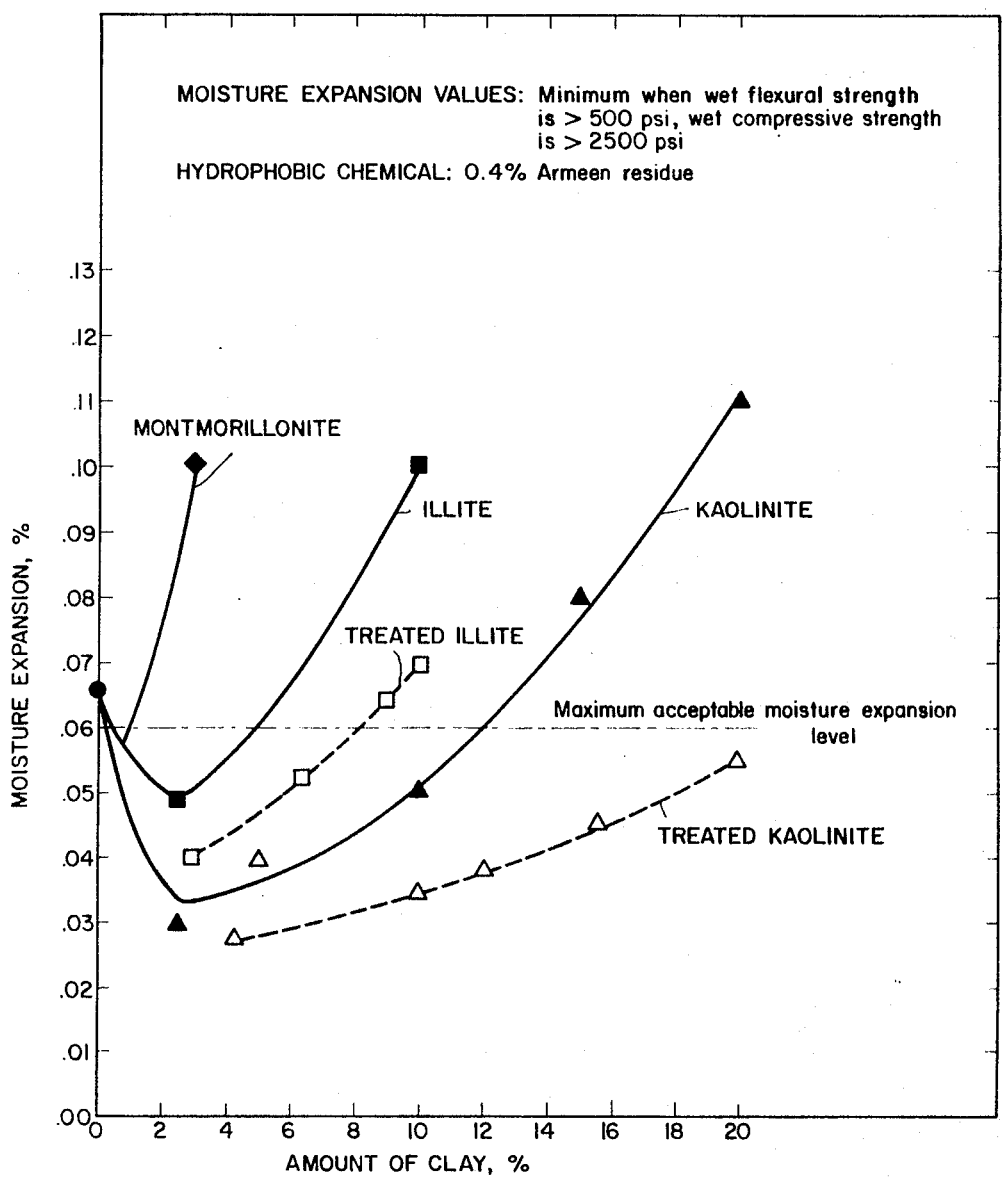

The results of these tests are illustrated in FIGURE 4. These results indicate that in order to control the moisture response below 0.06% and meet the strength requirements discussed above, the clay content of soil used for building materials should be below 12% if its is kaolinitic and below 5% if it is illitic. In the case of montmorillonite, only trace levels are acceptable. By treating the soil with a hydrophobic chemical the amount of clay can be increased considerably (Table 5).

In the case of montmorillonite, amine treatment is not likely to increase the amount of clay acceptable for building material. This is because increased amounts of montmorillonitic clay has adverse effects both on moisture expansion and on wet strengths.

Example VI

Figure 5:
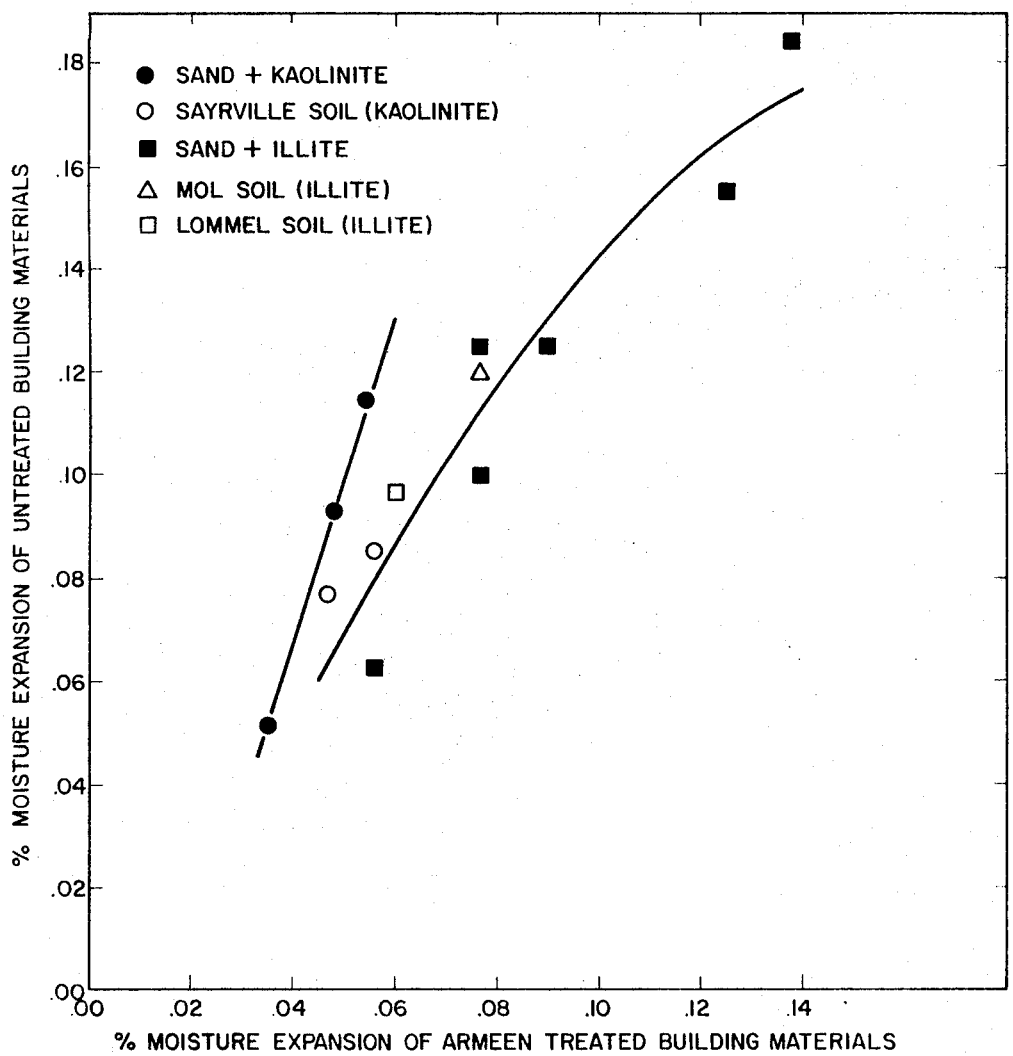

Additional tests were conducted to determine the relationship between moisture response of amine-treated and untreated building materials. The results of these tests are illustrated in FIGURE 5. These results indicate that Armeen residue treatment of building materials prepared from kaolinitic type soils reduces the moisture response of that product by 30 to 50%. Similar treatment of building materials made from illitic type soils reduces the moisture response of that product by 10% to 40%.

In general, percentage reduction in moisture response is greater at high base moisture response levels than at low values.

Example VII

Additional tests were conducted to determine the effect of different concentrations of the Armeen treat on the moisture response of building materials. These results are shown in the following Table 6.

TABLE 6.—EFFECT OF ARMEEN TREAT LEVEL ON BUILDING MATERIAL MOISTURE RESPONSE

| Soil | Armeen treat, wt. percent | Percent binder, wt. percent | Cure time at 400° F., hrs. | Moisture, exp. percent |
|---|---|---|---|---|
| 90% sand plus 10% kaolin | 0.2 | 8.5 | 8 | 0.047 |
| Do | 0.4 | 8.5 | 8 | 0.034 |
| 90% sand plus 10% illite | 0.2 | 8.5 | 8 | 0.090 |
| Do | 0.4 | 8.5 | 8 | 0.076 |

According to these results, 0.2% Armeen level was not as effective as the 0.4% Armeen level. Although 0.4% Armeen level appears to be excessive (FIGURE 5), it probably could not be reduced appreciably without lowering its effectiveness. As mentioned heretofore, the length of cure time will enhance the properties of the blocks.

Example VIII

Figure 6:
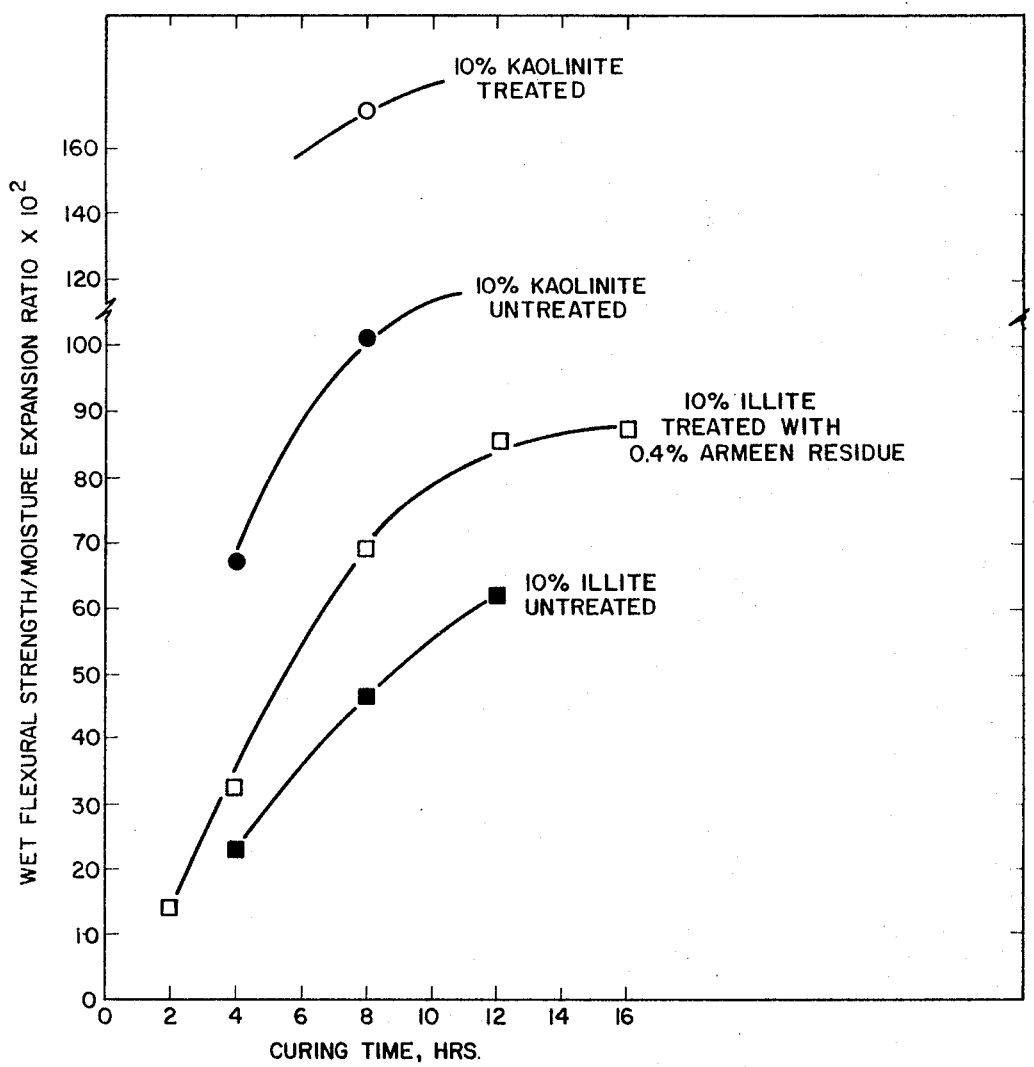

Additional tests were conducted to determine the relationship between curing time and the ratio of wet flexible strength to moisture expansion of amine-treated and untreated building materials. The results of these tests are shown on FIGURE 6.

The fact that the curve for the treated materials, both for kaolinite and illite, are above that of the untreated panels indicate that amine treatment reduces the moisture response without any sacrifice in wet strengths.

The difference between the strength/expansion ratio of kaolinite and illite is due to the difference in the moisture expansion. The wet flexural strength values for both type clays were about equal.

Example IX

In order to determine the effects of various amounts of lime on the performance of blocks the following experiment was initiated. Blocks were prepared from 15% clay SLS soil treated with lime ($CaCO_3$) ranging in concentration from 1% to 10%.

The results are presented in Table 7 below.

TABLE 7.—EFFECTS OF LIME ON THE PERFORMANCE OF BUILDING BLOCKS [1]

| | Binder, percent | Moisture exp., percent 7-day immersion | Wet flexural strength, p.s.i. |
|---|---|---|---|
| Amount of lime, percent: | | | |
| None | 9 | 0.085 | 790 |
| 1.0 | 9 | 0.079 | 790 |
| 2.5 | 9 | 0.079 | 740 |
| 5.0 | 9 | 0.076 | 740 |
| 10.0 | 9 | 0.081 | 586 |

[1] Panel density was 2.0 g./cc. or 86% of the theoretical.

As shown in the table, lime has only a slight effect on the moisture expansion and no effect on wet flexural strength. It was originaly expected that calcium ions present in lime would increase the asphalt-soil and soil-soil bonds and thus result in reduced moisture response.

Example X

Additional tests were carried out to determine the effect of clay in soil with respect to compaction pressure. The results of these tests are illustrated in FIGURE 7.

Example XI

Additional tests were conducted to determine the relationship between soil properties and the moisture expansion of the building blocks of the present invention. The results of these tests are illustrated in the following Table 8.

TABLE 8.—THE RELATIONSHIPS BETWEEN SOIL PROPERTIES AND MOISTURE EXPANSION OF BUIDLING BLOCKS

| Clay | | C.E.C., meq./ 100 g. | Specific surface, m.²/g. | Ratio Sp. surface C.E.C. | Moisture Exp., percent[1] | |
|---|---|---|---|---|---|---|
| Type | Percent | | | | Untreated | Treated |
| Kaolinite | 2.5 | 0.25 | 1.7 | 6.8 | .030 | |
| | 5.0 | 0.5 | 3.4 | 6.8 | .040 | .028 |
| | 10.0 | 1.0 | 6.8 | 6.8 | .050 | .035 |
| | 15.0 | 1.5 | 10.2 | 6.8 | .080 | .044 |
| | 20.0 | 2.0 | 13.6 | 6.8 | .110 | .054 |
| Illite | 2.5 | 0.63 | 3.4 | 5.4 | .048 | .039 |
| | 5.0 | 1.25 | 6.8 | 5.4 | .060 | .047 |
| | 10.0 | 2.50 | 13.5 | 5.4 | .100 | .070 |
| | 15.0 | 3.75 | 20.3 | 5.4 | .162 | .085 |
| Montmorillonite | 2.5 | 2.42 | 20.0 | 8.3 | .100 | |

[1] Minimum moisture expansion values when wet flexural strength is larger than 500 p.s.i. and wet compressuve strength is larger than 2,500 p.s.i.

The above table shows the relationships between the moisture response and several soil properties of the clay-sand mixes used (amine-treated and untreated). It is concluded from these results that the cation exchange capacity and specific surface of soils could be used to characterize soils to be used for the manufacture of building materials.

The present invention is concerned with the production of high quality building materials having desirable strengths and which materials are substantially immune to the effect of moisture as determined by the moisture response factor. These materials are secured by the use procedural techniques in the manufacture of these materials used in conjunction wiih an amine, preferably an amine having from about 8–24 carbon atoms and used in a concentration in the range from about 0.01 to 2% by weight, preferably 0.1 to 0.6% by weight, of the weight, of the building material.

What is claimed is:

1. In a process wherein a structural element of high compressive and tensile strength is prepared by intimately admixing a finely divided aggregate with a bituminous binder, said bituminous binder being present in the resulting admixture in an amount in the range from about 3 to 30 wt. percent based on the aggregate and wherein said admixture is compacted into the form of said structural element by applying to said form a compaction pressure to secure a theoretical density in the range from about 70 to 98% and wherein said structural element is cured in an oxidizing atmosphere at a temperature in the range from about 250° to 500° F. for a time period in the range from about 2 to 80 hours, the improvement which comprises treating said aggregate at some stage of the process with from about 0.1 to 2% by weight of a water-insoluble, hydrophobic amine containing from about 8 to 24 carbon atoms in the molecule whereby a structural element of high compressive and tensile strength and having a low moisture response factor is secured.

2. Process as defined by claim 1 wherein the amine is octadecylamine.

3. Process as defined by claim 1 wherein the amount of bituminous binder is in the range from about 5.5% to 12% by weight.

4. A hard, dense, stabilized, compacted, cured, bituminous, solid composition of enhanced compressive strength, and a low moisture response factor which composition comprises a mixture of a solid aggregate with from 3 to 30 wt. percent based on the solid of a bituminous binder having an ASTM softening point of at least 100° F., and having in combination therewith from about 0.1 to 2% by weight of a water insoluble hydrophobic amine containing from about 8 to 24 carbon atoms in the molecule.

5. A stabilized, compacted asphalt soil composition having enhanced wet and dry compressive strength and a low moisture response factor which composition comprises a mixture of a substantially dry soil having a clay content of from 10 to about 21 wt. percent and from 8 to 30 wt. percent based on the soil of asphalt having an ASTM softening point of above 100° F., and having in combination from about 0.1 to 2% by weight of a water-insoluble, hydrophobic amine containing from about 8 to 24 carbon atoms in the molecule.

6. Process as defined by claim 1 wherein the amine is added to the agregate before mixing with said bituminous binder.

7. Process as defined by claim 1 wherein the amine is added to the bituminous binder before mixing with the aggregate.

References Cited

UNITED STATES PATENTS

| | | | |
|---|---|---|---|
| 2,375,563 | 5/1945 | Holmes | 106—281 |
| 2,730,454 | 1/1956 | Sommer et al. | 106—273 XR |
| 2,851,824 | 9/1958 | Campbell | 106—273 XR |
| 3,028,249 | 4/1962 | Hoiberg | 106—273 |
| 3,070,524 | 12/1962 | Alexander et al. | 106—278 XR |
| 3,096,192 | 7/1963 | Pitchford | 106—281 |
| 2,274,016 | 9/1966 | Rogers et al. | 106—281 |
| 3,281,256 | 10/1966 | Rogers et al. | 106—281 |
| 3,287,146 | 11/1966 | Rogers et al. | 106—281 |
| 3,330,677 | 7/1967 | Rogers et al. | 106—281 |
| 2,387,982 | 6/1968 | Rogers et al. | 106—281 |

DONALD J. ARNOLD, Primary Examiner

JOAN B. EVANS, Assistant Examiner

U.S. Cl. X.R.

106—38.8; 264—29